(12) United States Patent
Murarka et al.

(10) Patent No.: US 11,934,411 B1
(45) Date of Patent: Mar. 19, 2024

(54) REGIONALIZATION OF CONTENT BASED ON AVAILABILITY OF SIMILAR CONTENT

(71) Applicant: Amazon Technologies, Inc., Seattle, WA (US)

(72) Inventors: Ishesh Murarka, Bothell, WA (US); Sneha Poddar, Kolkata (IN); Aruna Manohar Daryanani, Mumbai (IN); Dhananjay Anandarao Bhor, Seattle, WA (US); Sai Manjeera Muktineni, Bothell, WA (US); Michinari Momma, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 16/994,986

(22) Filed: Aug. 17, 2020

(51) Int. Cl.
| | |
|---|---|
| G06F 17/00 | (2019.01) |
| G06F 16/2457 | (2019.01) |
| G06F 16/248 | (2019.01) |
| G06F 16/29 | (2019.01) |
| G06N 20/00 | (2019.01) |
| G06Q 30/0601 | (2023.01) |

(52) U.S. Cl.
CPC ...... *G06F 16/24575* (2019.01); *G06F 16/248* (2019.01); *G06F 16/29* (2019.01); *G06N 20/00* (2019.01); *G06Q 30/0625* (2013.01)

(58) Field of Classification Search
CPC .. G06F 16/24575; G06F 16/248; G06F 16/29; G06N 20/00; G06Q 30/0625
See application file for complete search history.

(56) References Cited

U.S. PATENT DOCUMENTS

| | | | |
|---|---|---|---|
| 9,141,987 B2* | 9/2015 | Perks | G06Q 30/0641 |
| 10,685,308 B1* | 6/2020 | Avery, Jr. | H04L 67/10 |
| 10,726,472 B2* | 7/2020 | Isaacson | G06Q 30/0625 |
| 2002/0147657 A1* | 10/2002 | Callender | G06Q 10/087 |
| | | | 705/7.34 |
| 2013/0066740 A1* | 3/2013 | Ouimet | G06Q 30/02 |
| | | | 705/26.7 |
| 2013/0191246 A1* | 7/2013 | Calman | G06Q 30/0639 |
| | | | 705/26.9 |

(Continued)

OTHER PUBLICATIONS

Simen Eide and Ning Zhou. Deep neural network marketplace recommenders in online experiments. In Proceedings of the 12th ACM Conference on Recommender Systems (RecSys '18). Association for Computing Machinery, New York, NY, USA, 387-391, Sep. 2018.*

(Continued)

*Primary Examiner* — Greta L Robinson
(74) *Attorney, Agent, or Firm* — K&L Gates LLP

(57) ABSTRACT

Devices and techniques are generally described for regionalizing content based on the availability of similar content. In some examples, a first search query related to a first item may be received. A determination may be made that the first search query is associated with a first region. In some examples, the first item may be determined to be associated with the first region based at least in part on at least one of the first item or items classified as substitutes for the first item being available in a plurality of regions. A first plurality of search results associated with the first region may be determined. In further examples, code may be generated to cause the first computing device to display the first plurality of search results.

20 Claims, 7 Drawing Sheets

(56) References Cited

U.S. PATENT DOCUMENTS

| | | | |
|---|---|---|---|
| 2015/0012384 A1* | 1/2015 | Bank | G06Q 30/0633 |
| | | | 705/26.41 |
| 2016/0092949 A1* | 3/2016 | Masenza | G06Q 30/0631 |
| | | | 705/26.2 |
| 2016/0217522 A1* | 7/2016 | Jnagal | G06F 16/95 |
| 2018/0005305 A1* | 1/2018 | Hirsch | G06Q 30/0625 |
| 2018/0107917 A1* | 4/2018 | Hewavitharana | G06F 16/2468 |
| 2018/0130072 A1* | 5/2018 | Ouimet | G06Q 30/02 |
| 2019/0311301 A1* | 10/2019 | Pyati | G06Q 30/0202 |
| 2020/0175564 A1* | 6/2020 | Kulasooriya | G06F 16/285 |
| 2020/0250729 A1* | 8/2020 | Soohoo | G06N 20/00 |
| 2020/0250731 A1* | 8/2020 | Soohoo | G06Q 30/0631 |

OTHER PUBLICATIONS

Fidel Cacheda et al., Click Through Rate Prediction for Local Search Results. In Proceedings of the Tenth ACM International Conference on Web Search and Data Mining, Association for Computing Machinery, 171-180. <https://doi.org/10.1145/3018683>, Feb. 2017.*

Siva Gurumurthy et al., Improving web search relevance and freshness with content previews. In Proceedings of the 19th ACM international conference on Information and knowledge management, Association for Computing Machinery, 1159-1168, <https://doi.org/10.1145/1871437.1871584> Oct. 2010.*

* cited by examiner

REGIONALIZATION OF CONTENT BASED ON AVAILABILITY OF SIMILAR CONTENT

BACKGROUND

In online marketplaces, sellers offer content for sale that can be purchased by buyers. However, the buyers may be located in geographically disparate locations relative to the location of the purchased item. As such, items are often shipped long distances in order to fulfill the order. Longer deliveries not only increase the delivery cost (e.g., due to increased fuel consumption and vehicle usage), but also lead to an increase in carbon footprint and increased delivery times relative to more short-range, local deliveries.

DETAILED DESCRIPTION

Figure 1:
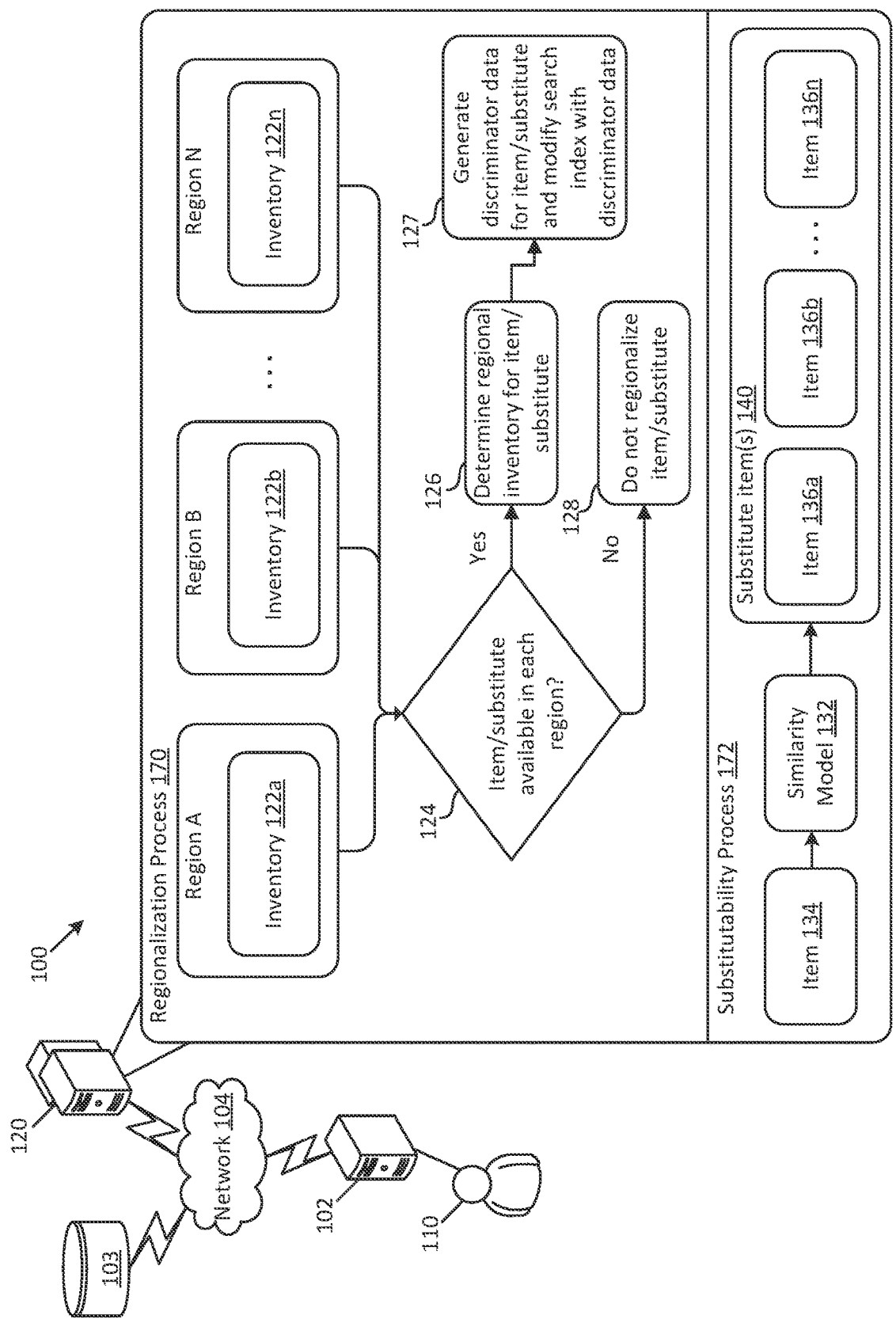
FIG. 1 is a block diagram depicting an example system effective to determine substitutable content and regionalize content, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

In an online marketplace (e.g., an e-commerce system) different sellers have product inventories that are spread over large geographic areas. For example, some goods may be stored in warehouses in only one location even though orders may be received for that item from around the world. Long delivery distances may lead to increased cost for the seller and/or the e-commerce system provider, depending on the entity paying for delivery. In addition, long deliveries are inefficient, as they take longer and consume more fuel relative to shorter deliveries.

Some e-commerce systems provide geographically-distributed warehousing systems that allow regional sellers to provision their goods at various different locations in order to reduce delivery times and associated costs. However, sellers may not be able to provide a sufficient amount of inventory to each warehouse location. Long and/or expensive delivery times may lead to a decrease in customer engagement and/or purchase of products.

Described herein are techniques that are used to identify items that are similar to a given item and may therefore be considered a substitute for the item. For example, a phone case by seller A may be a substitute item for a phone case by seller B if the two phone cases are for the same model of phone, and are similar in terms of appearance, material, and/or price. In various examples described below, machine learning systems may be used to identify a list of similar items (e.g., substitutable items) for each item stored in a database (e.g., for each item or for a subset of items for sale via an e-commerce service). The machine learning systems may determine item similarity/substitutability on the basis of images of the items, descriptions of the items, and/or metadata attributes and/or keywords related to the items.

In various examples, a number of geographic regions may be defined. Any size and any number of geographic regions may be selected, according to the particular implementation. Data may be used to identify a particular region from another. Once a list of similar items are determined for each item in the database (e.g., for each item or for a subset of items for sale via an e-commerce service) items that have substitutes available in each of the defined regions may be determined and may be regionalized using the various techniques described herein.

For example, there may be four defined regions (in the example the regions may be for the United States, although any size geographic region may be used including international regions, intra-national regions and/or some combination thereof). The defined regions may be the Northeast, the Southeast, the Northwest, and the Southwest. In the example, each of the regions may correspond to a defined geographical area. In the example, a first item—a blue pencil—may be determined to have three different substitute items (e.g., three different blue pencils that are similar to the first item in terms of appearance, price, style, etc., such that the three different blue pencils have been classified as substitutable for the first item). For simplicity, the first item and the three substitute items are referred to in the example as item 1, item 2, item 3, and item 4. If a determination is made that at least one of item 1, item 2, item 3, and item 4 is available in each of the four regions (Northeast, Southeast, Northwest, and Southwest), the items may be regionalized, as described below.

For example, if item 1 available in the Northeast, item 2 is available in the Southeast and the Southwest, item 3 is available in the Northwest, and item 4 is available in the Northeast, items 1, 2, 3, and 4 may be regionalized, using the various techniques described below. In the example, the quality of being "available" indicates that an item is available in inventory in the particular region. However, if none of items 1, 2, 3, and 4 are available in the Northeast region, a determination may be made that the items 1, 2, 3, and 4 are not to be regionalized.

Regionalization of a particular item may include adding metadata that is associated with the item, indicating that the item is available in inventory in a particular region. In various examples described herein, the metadata may be referred to as "discriminator data." In the example above, metadata may be added in association with item 1 indicating that item 1 is available in the Northeast. Similarly, first metadata may be added in association with item 2 indicating that item 2 is available in the Southeast and second metadata may be added in association with item 2 indicating that item 2 is available in the Southwest, and so on.

Once items 1, 2, 3, and 4 have been regionalized as described above, various techniques may be used to perform a filtering operation to filter out non-regional items during search and/or during recommendation. For example, a user may search (e.g., by name) for item 1. The user's search query may include metadata indicating a location/region from which the search query was issued (e.g., an IP address, etc.). In the example, the user's search query may indicate that the search query is from the Northeast region. The search query may be modified prior to execution to add the metadata indicating the location from which the search query was received. The modified search query may be executed and a plurality of search results may be returned (e.g., according to the particular search/recommendation algorithm being used). However, before the list of results is returned to the user, the results may be filtered to remove any out-of-region and/or national item listings. For example, the search may initially return item 1 (available in Northeast), item 2 (available in Southeast and Southwest), item 3 (available in the Northwest), and item 4 (available in the Northeast). However, the search may be filtered to remove items 2 and 3 (since they are not available in the Northeast). Accordingly, the search results returned to the user may include items 1 and 4—items that are regionalized with respect to the user. In various example implementations, items (or other content) that are nationalized and/or which are available in multiple regions (including the source region of the query) may optionally be filtered out in order to surface only the regionalized results.

Dynamically regionalizing similar products may save considerable resources due to shorter shipping times and costs and may reduce pollution associated with long-distance shipping. Additionally, by selecting content that is similar and/or is a substitute of the top-ranked content the user experience may be minimally impacted. Further, unique products and/or products that do not have substitutes available across all regions may continue to be available without impacting the current user experience.

For example, a branded smart phone case having one or more off-brand substitute phone cases may be regionalized. If a query for the branded smart phone case is received from Seattle, only the items that are available in local inventory may be displayed among the search results. The branded smart phone case may only be available in inventory in Florida (or some other region that is different from the region associated with the query). Accordingly, the branded smart phone case may not be displayed among the search results returned for the Seattle-based query. Instead, only the locally-available substitute item may be displayed. Conversely, if an item is not regionalized, the item may be returned as a part of search results in all regions, irrespective of the region from which the query was received.

Machine learning techniques, such as those described herein, are often used to form predictions, solve problems, recognize objects in image data for classification, etc. For example, herein machine learning techniques may be used to determine substitute items for a given item. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding is a mapping of a discrete, categorical variable to a vector of continuous numbers. In neural networks, embeddings are typically of lower dimensions relative to the data that the embeddings represent. In various examples, token embeddings may be generated to represent various text (e.g., review snippets) described herein for input into the various machine learning models described herein.

FIG. 1 is a block diagram depicting an example system 100 effective to determine substitutable content and regionalize content, according to various embodiments of the present disclosure.

As depicted in FIG. 1, a user 110 may interact with a computing device 102. Computing device 102 may be, for example, a desktop computing device, a laptop, a mobile device (e.g., a smartphone), a tablet, an embedded system, etc. In the example depicted in FIG. 1, user 110 may interact with an e-commerce service and/or a search service via computing device 102 to search for content (e.g., products, media, web pages, etc.). In various further examples, the user 110 may interact with particular content (e.g., on a display of computing device 102) and one or more computing devices 120 may determine other recommended content for the user that may, in some cases, be regionalized using the various techniques described herein.

The computing device 102 may include a display and/or a voice controlled interface that the user may use to interact with content. Computing device 102 may communicate with one or more of the other components depicted in FIG. 1 over a network 104 such as a local area network (LAN) and/or a wide area network (WAN) such as the internet. For example, computing device 102 may communicate with the one or more back-end computing devices 120 via network 104. In various examples, one or more non-transitory computer-readable memories 103 may be configured in communication (e.g., directly and/or via network 104) with computing devices 102 and/or the one or more computing devices 120. The one or more non-transitory computer-readable memories 103 may store instructions that, when executed by at least one processor of computing device 102 and/or the one or more computing devices 120, are effective to cause one or more of the various techniques described herein to be performed.

In the example depicted in FIG. 1, the back-end computing devices may be configured to perform a regionalization process 170 and/or a substitutability process 172. Regionalization process 170 may determine whether an item (or content, more generally) may be regionalized in accordance with the various techniques described herein. Substitutability process 172 may be machine learning process for determining substitute items in a data set based on an input item 134 (and/or an input data representation of item 134).

For regionalization process 170, any number of regions may be defined. The regions may correspond to any size geographical area, depending on the desired implementation. Additionally, there is no requirement that the regions be the same size with respect to one another. In the example in FIG. 1, regions A, B, N are defined. Each region may be associated with an inventory that is local to that region. For example, inventory 122a may be associated with region A, inventory 122b may be associated with region B, etc. The inventories (e.g., inventories 122a, 122b, . . . , 122n) may describe the number of items of a particular type that are available (e.g., for sale and/or shipment) in a given region.

System 100 may determine (block 124) whether a set of items comprising a given item and items classified (e.g., via substitutability process 172) as substitutes for that item are available in each region. In various examples, the number of regions in which either the item or a substitute item is required to be available in order to regionalize the item/substitutes may be defined by an administrator of the system. In some examples, the item (and/or one of its substitutes) may be required to be available in all regions prior to regionalization. In other examples, the item (and/or one of its substitutes) may be required to be available in a subset of all of the regions in order to be regionalized. If at least one of the item and/or items classified as substitutes of the item are available in the requisite regions, processing may continue to block 126, at which the regional inventory for the item and the items classified as substitutes for the item may be determined.

For example, item 1 may be a phone case for a particular model of phone. Items 2 and 3 may also be phone cases for the particular model of phone and may be determined via substitutability process 172 as substitute items for item 1. In the example, regionalization process 170 may define regions A, B, and C. At block 124, a determination may be made whether at least one of items 1, 2, and 3 is available in the inventory of each of regions A, B, and C. If so, at block 126, the inventory of each item, in each region may be determined. In the example, item 1 may be available in regions A and B, but not in region C. Item 2 may be available only in region B. Item 3 may be available in region C.

At block 127, discriminator data may be generated for each item/substitute. Discriminator data may be metadata that may be used to indicate that a particular item is available (e.g., has available inventory) in a particular region. Using the foregoing example, discriminator data may be associated with item 1 to indicate that item 1 is available in regions A and B. Similarly, discriminator data may be associated with item 2 to indicate that item 2 is available in region B and discriminator data may be associated with item 3 to indicate that item 3 is available in region C.

As described in further detail below, items/substitutes that are regionalized (e.g., by associating regional discriminator data with the item(s)) may indicate that search results and/or recommendations related to the items are to be filtered to remove non-regionalized results during search. For example, if a user from region B searches for phone cases of the sort represented by items 1, 2, and 3, item 3 may not be included in the search results since item 3 is not available locally to the user (e.g., item 3 is only available in region C). In some further examples, item 1 may be optionally filtered out, since item 1 is available in both regions A and B, in favor of surfacing item 2, which is only available in region B and is thus local to the user. However, in at least some examples, both items 1 and 2 may be among the regionalized search results for the user since both items 1 and 2 are available local to the user in region B. In various examples, system 100 may generate code to cause the regionalized search results to be displayed and/or otherwise output by computing device 102.

Conversely, if at block 124, a determination is made that there is at least one region of the defined set of regions in which neither the item nor any items classified as substitutes for the item are available in inventory, processing may continue to block 128. At block 128 a determination may be made that the item (and its substitutes) may not be regionalized. In other words, the item may still be available to out-of-region buyers and may be provided as search results outside of a buyer's region.

In various example embodiments, the substitutability process 172 may determine a set of one or more substitute item(s) 140 (e.g., including substitute item 136a, 136b, . . . , 136n) for a given item 134. In various examples, a feature representation of item 134 may be input into a similarity model 132 that may determine the set of substitute item(s) 140. For example, similarity model 132 may be a machine learning model such as a neural network, a nearest neighbor algorithm (e.g., K-means clustering, KNN, etc.), and/or some other classifier, depending on the particular implementation. In various examples, a feature vector representing item 134 may be generated. For example, a multi-dimensional feature vector may be generated that encodes various attributes of item 134 such as, for example, description keywords, images of the item, price, whether or not the item is branded, inventory position, seller fulfillment channel, etc. The feature vector may be input into similarity model 132 and the set of substitute item(s) 140 may be determined. In various examples, an item 134 may be unique and therefore there may be no substitute item(s) 140. Typically, non-branded items that are similar to the input item 134 (e.g., in terms of price, style (or appearance generally), availability, etc., may be determined as substitute items for item 134. In some examples, the set of substitute item(s) 140 for a given input item 134 may be stored in a data store (e.g., in non-transitory computer-readable memory 103). Accordingly, a set of substitute items may be determined for each item/content in a content catalogue (and/or any desired subset thereof) and may be stored in memory. After determining a list of substitute items associated with each input item, the regionalization process 170, described above, may be performed to determine whether or not to regionalize each item.

In some other examples, compound features may be computed that describe various attributes of the products and which may be used to determine substitute items (e.g., substitute items 136a, 136b, . . . , 136n). In various examples, the compound features may represent one or more of images of the items, descriptions of the items, titles of the items, keywords, user behavior (e.g., users that clicked on item A also clicked on item B) signals, etc. The compound features generated for different items may be compared to determine the closest items to one another in a high dimensional embedding space.

Figure 2:
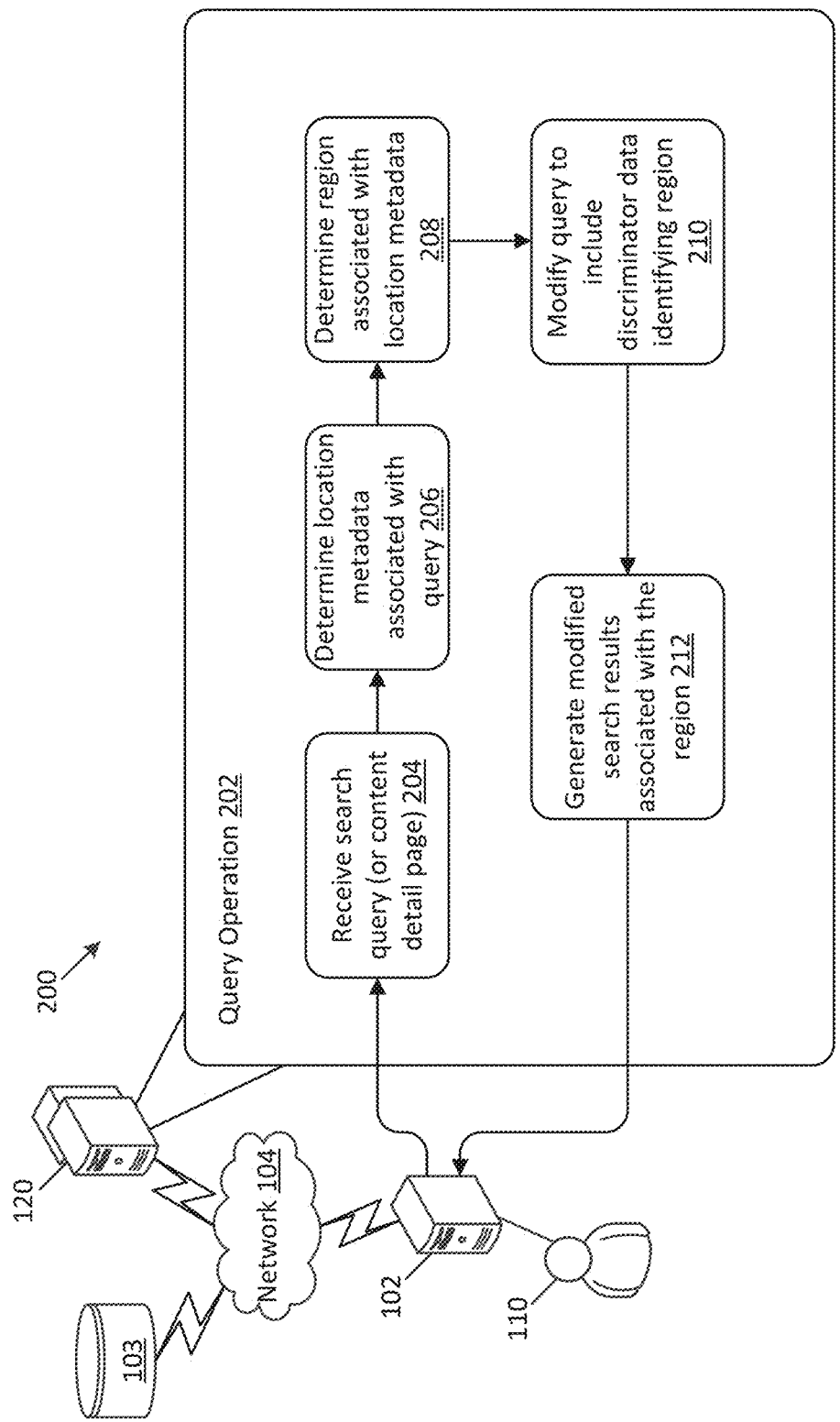
FIG. 2 depicts an example system effective to modify queries to regionalize search results, in accordance with various aspects of the present disclosure.

FIG. 2 depicts an example system 200 effective to modify queries to regionalize search results, in accordance with various aspects of the present disclosure. Although depicted as different systems (e.g., system 100 and system 200) in FIGS. 1 and 2, systems 100 and 200 may be instantiated in a combined system in some example implementations.

A query operation 202 of system 200 is depicted in FIG. 2. A search query (or content detail page) may be identified at block 204. In various examples, a search query may be received from user 110 via a search interface (e.g., a product search interface, web search interface, etc.). In some other examples, a user of a content service may select a particular item to view a detail page describing the item. In examples where a search query is received, content (e.g., an item) indicated by the search query may be determined. In examples where a detail page is visited by a user, content (e.g., an item) associated with the detail page may be determined.

At block 206, location metadata associated with the query and/or associated with the computing device 102 that has requested the content detail page may be determined. The location metadata may identify a general location of the computing device 102 from which the query and/or the request to visit the content detail page emanated. For example, the location metadata may identify, for example, a particular state, region, province, city, etc., from which the query was received. In various examples, the location metadata may be received in accordance with a user permission provided by the user 110 to share location data.

At block 208, a region that is associated with the location metadata may be determined. For example, the location metadata may be a code that corresponds to a particular region defined during the regionalization process 170 described in reference to FIG. 1. Accordingly, at block 208, the location metadata associated with the user query (or other user request) may be used to determine a region associated with the user and/or computing device 102.

At block 210, the query (and/or the request to display content—such as recommended content) may be modified to include discriminator data identifying the region determined at block 208. Prior to search, the search index may be modified such that regionalized items are associated with discriminator data identifying the region(s) in which those items have been regionalized. Accordingly, search results associated with the query (and/or other request) are regionalized by matching the discriminator data in the query to the discriminator data for relevant items in the search index. At block 212, the search results are referred to as "modified" search results, as the search results may be different than the search results from a non-regionalized search.

That is to say, the search results may not include results that are unassociated with the region identified by the discriminator data. As described previously, in reference to FIG. 1, regionalized content (e.g., content associated with discriminator data indicating a region that is the same as the user 110's region) may be surfaced in response to the user 110's query/request. In various examples, the surfaced content may be a substitute item for an item that may have otherwise appeared had the search/request not been regionalized. In various examples, code configured to cause the regionalized content (e.g., regionalized search results and/or regionalized recommendations) to be output (e.g., displayed and/or output as audio) may be generated by system 200.

For example, location metadata may indicate that a user is associated with region A. The user's query/request may be modified to include discriminator data indicating region A. The results of the query/request may therefore not include results that are not available in region A. In some example implementations, search results that are available in region A, but which are also available in other regions (e.g., "national" results or similar) may also be removed in favor of results that are only available in region A. However, in other implementations any search results available in region A may be returned, regardless of whether the particular results are also available in other regions.

In various examples, if there are no in-region items available for a particular search query (e.g., there are no items regionalized for the user's location for a particular query), out-of-region results may be displayed as a fallback option. Additionally, there may be other scenarios in which out-of-region (e.g., non-regionalized) results may be displayed. For example, a user may enter an out-of-region item detail page (e.g., a webpage dedicated to a particular item) from an internet search engine. Additionally, in some example implementations, out-of-region search results may be filtered out, but recommendations of similar items may be displayed irrespective of whether the similar items are out-of-region or not. For example, when a user has selected a particular item to view, similar items may be displayed that may be of interest to the user. In some examples, such similar items may be displayed whether or not they are in-region. In some further examples, a user may be able to selectably control whether or not search results are regionalized. For example, a selectable control may be displayed in conjunction with the message "Would you like to see only results offering delivery within 1 day?" Selection of such a control may turn on regionalization of search results, as described herein.

Figure 3:
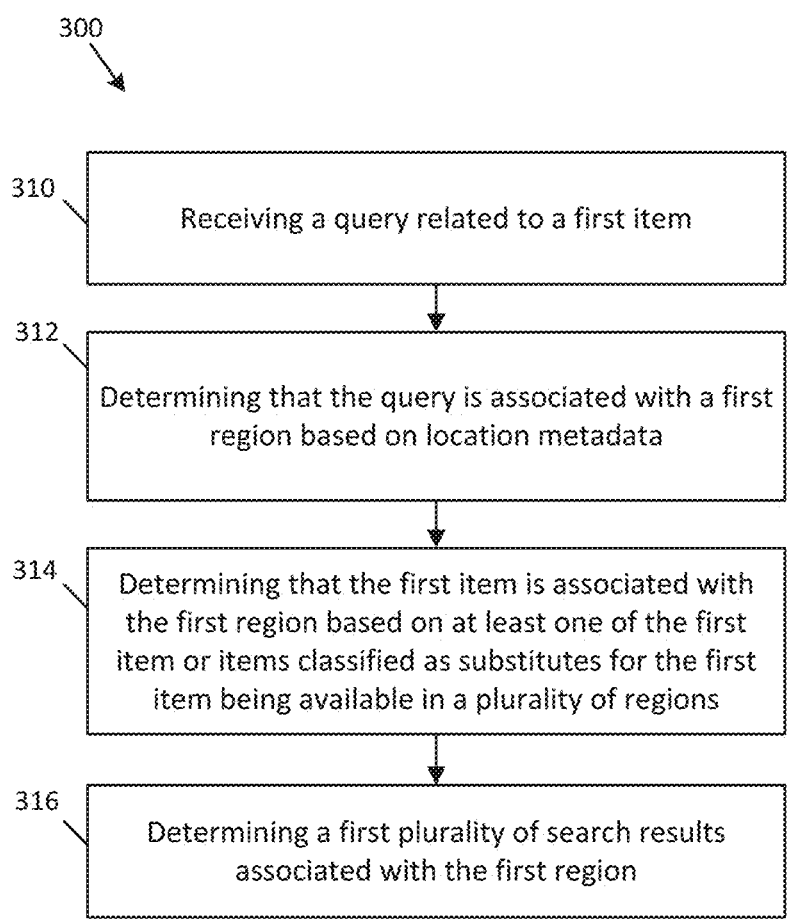
FIG. 3 depicts an example process for dynamically regionalizing search results, in accordance with various aspects of the present disclosure.

FIG. 3 depicts an example process 300 for dynamically regionalizing search results, in accordance with various aspects of the present disclosure. Those portions of FIG. 3 that have been previously discussed in reference to FIGS. 1 and 2 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 310, at which a query related to a first item may be received. Alternatively, an indication of a first item that is not associated with a query may be received. For example, the first item may be selected and process to display recommended items (e.g., based on the first item) may be initiated.

Processing may continue from action 310 to action 312, at which a determination may be made that the query is associated with a first region based on location metadata. In various examples, the query (and/or some other data received from the user) may be associated with a particular region using location metadata.

Processing may continue from action 312 to action 314, at which a determination may be made that the first item is associated with the first region based on at least one of the first item or items classified as substitutes for the first item being available in a plurality of regions. At action 314, it may be determined that at least one of the first item or a substitute item for the first item is available in a plurality of regions (e.g., in all defined regions and/or a pre-defined subset of all the defined regions). If so, the first item (and the substitute items for the first item) may be regionalized using the regionalization process 170 described in reference to FIG. 1. As described, the items may be regionalized by associating discriminator data with the items, where the discriminator data indicates regions in which the particular item is available (e.g., in inventory).

Processing may continue from action 314 to action 316, at which a first plurality of search results (or recommendations) that are associated with the first region may be determined. At action 316, the search query (and/or recommendation system) may be used to determine search results for the received query. Any desired search algorithm and/or recommendation system may be used to provide the first plurality of search results. In some examples, the search query may be modified to include discriminator data associating the search query with the location data indicating the first region. Accordingly, during search, those search results that are not associated with the first region (e.g., those search results in the search index that are not associated with discriminator data specifying the first region) may be filtered out so that only search results that are associated with the first region are returned. In some example implementations, search results that are associated with multiple regions may be filtered out in favor of search results that are associated only with the specific region associated with the user's query/request.

Figure 4:
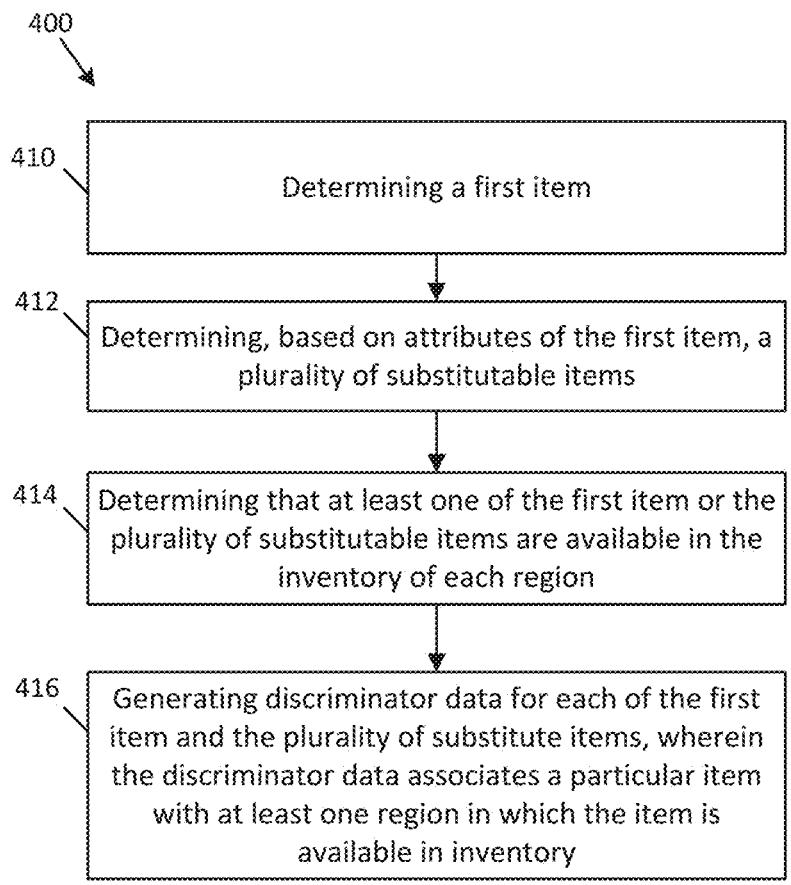
FIG. 4 depicts an example process for determining whether or not to regionalize content, in accordance with various aspects of the present disclosure.

FIG. 4 depicts an example process 400 for determining whether or not to regionalize content, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 410, at which a first item may be determined. The first item may be a catalog item (and/or other content) for which a list of potential substitute items and/or otherwise similar items/content is to be determined. In various other examples, the first item may be an item for which similar items (e.g., substitute items) are to be recommended and/or determined.

Processing may continue from action 410 to action 412, at which a plurality of substitute items may be determined for the first item, based on attributes of the first item. In various examples, attributes of the first item (e.g., images, keywords describing the first item, attributes such as price, brand, etc.) may be encoded as a feature vector representing the first item. The feature vector may be input into a machine learning model used to identify the most similar items to the first item in a common feature space. In various examples, items within a threshold degree of similarity (e.g., within a threshold distance in the feature space) may be determined to be substitute items for the first item.

Processing may continue from action 412 to action 414, at which at least one of the first item or the plurality of substitutable items may be determined to be available in the inventory of each region. At action 414, a determination may be made that the first item and/or one of the first item's substitute items (e.g., as determined at action 412) is available in each region of a pre-defined set of regions. In some examples, the pre-defined set of regions may be all the regions and/or a subset of all the regions. In various examples, the determination that at least one of the first item and/or substitute items for the first item are available in each region may be made prior to regionalizing the search for the first item (or a substitute of the first item). If an item is regionalized for a particular region, out-of-region search results may be filtered out in favor of results that are only available in the relevant region (e.g., in the user's region that is requesting the search).

Processing may continue from action 414 to action 416, at which discriminator data may be generated for each of the first item and the plurality of substitute items. The discriminator data may associate each respective item with regions in which the particular item is available in inventory. For example, substitute items 12 and 13 may be determined to be substitute items for the first item (I1) at action 412. Accordingly, items I1, I2, and I3 may be regionalized. In the example, item I1 may be available in region 1, item I2 may be available in region 2, and item I3 may be available in region 3. Accordingly, discriminator data may be associated with each item that defines a region with which the item is to be regionalized. For example, discriminator data may be generated and associated with item I1 that regionalizes item I1 in region 1. Similarly, discriminator data may be generated and associated with item I2 that regionalizes item I2 in region 2. Similarly, discriminator data may be generated and associated with item I3 that regionalizes item I3 in region 3. Later, if a search query is received associated with region 3, items I1 and I2 may be filtered out of the search results as items I1 and I2 are not associated with region 3 (due to their respective discriminator data indicating regions 1 and 2). However, item I3 may be among the search results, as the discriminator data for item I3 associates item I3 with region 3 (e.g., the region with which the search query is related).

Figure 5:
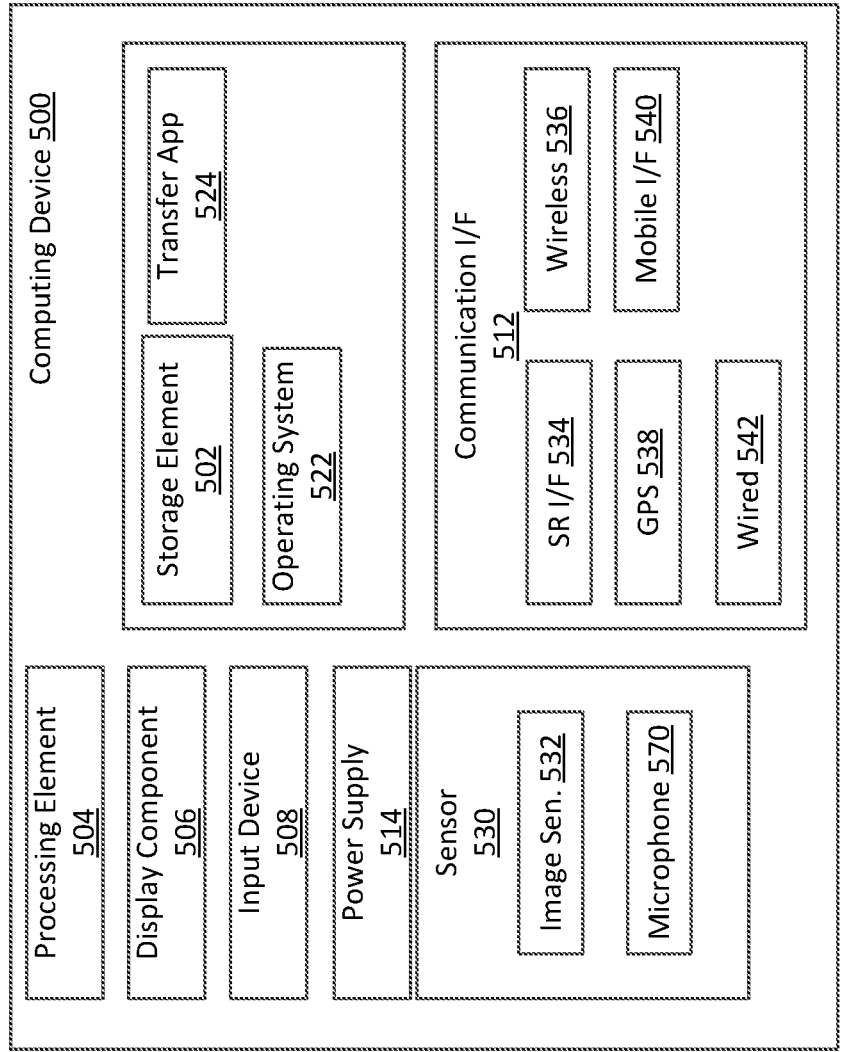
FIG. 5 is a block diagram showing an example architecture of a computing device that may be used in accordance with various embodiments described herein.

FIG. 5 is a block diagram showing an example architecture 510 of a computing device 500 that may be used to generate the graphical user interfaces and/or the machine learning models described herein, in accordance with various aspects of the present disclosure. It will be appreciated that not all devices will include all of the components of the architecture 510 and some user devices may include additional components not shown in the architecture 510. The architecture 510 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 510. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device 500 and may facilitate communications and commands between applications executing on the architecture 510 and various hardware thereof. A transfer application 524 may be configured to receive images, audio, and/or video from another device (e.g., a mobile device, image capture device, and/or display device) or from an image sensor 532 and/or microphone 570 included in the architecture 510.

When implemented in some user devices, the architecture 510 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 510 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 510. These input devices 508 may be incorporated into the architecture 510 or operably coupled to the architecture 510 via wired or wireless interface. In some examples, architecture 510 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 510 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 510. A wired communication module 542 may be configured to communicate according to the USB protocol or any other suitable protocol.

The architecture 510 may also include one or more sensors 530 such as, for example, one or more position sensors, image sensors, and/or motion sensors. An image sensor 532 is shown in FIG. 5. Some examples of the architecture 510 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
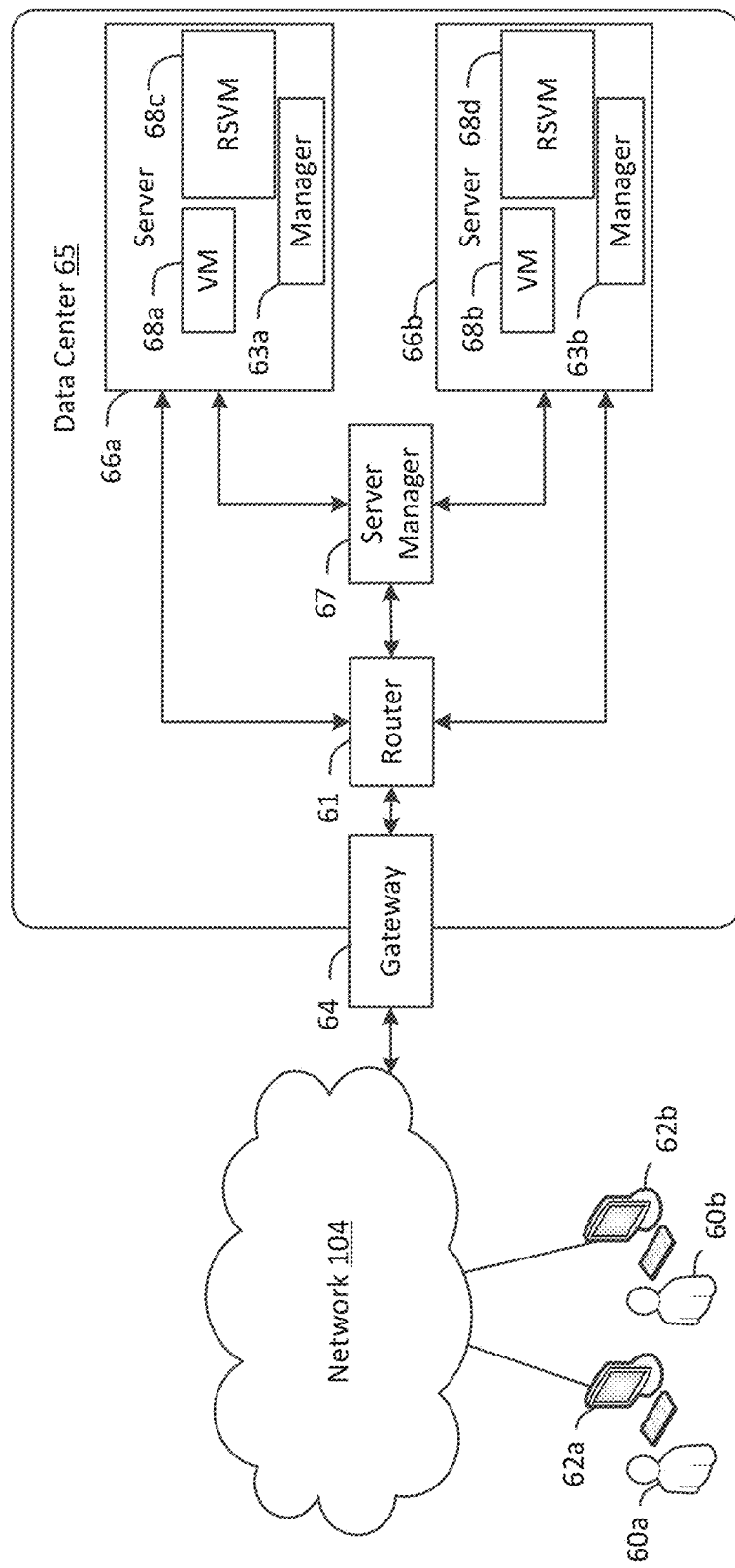
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Figure 7:
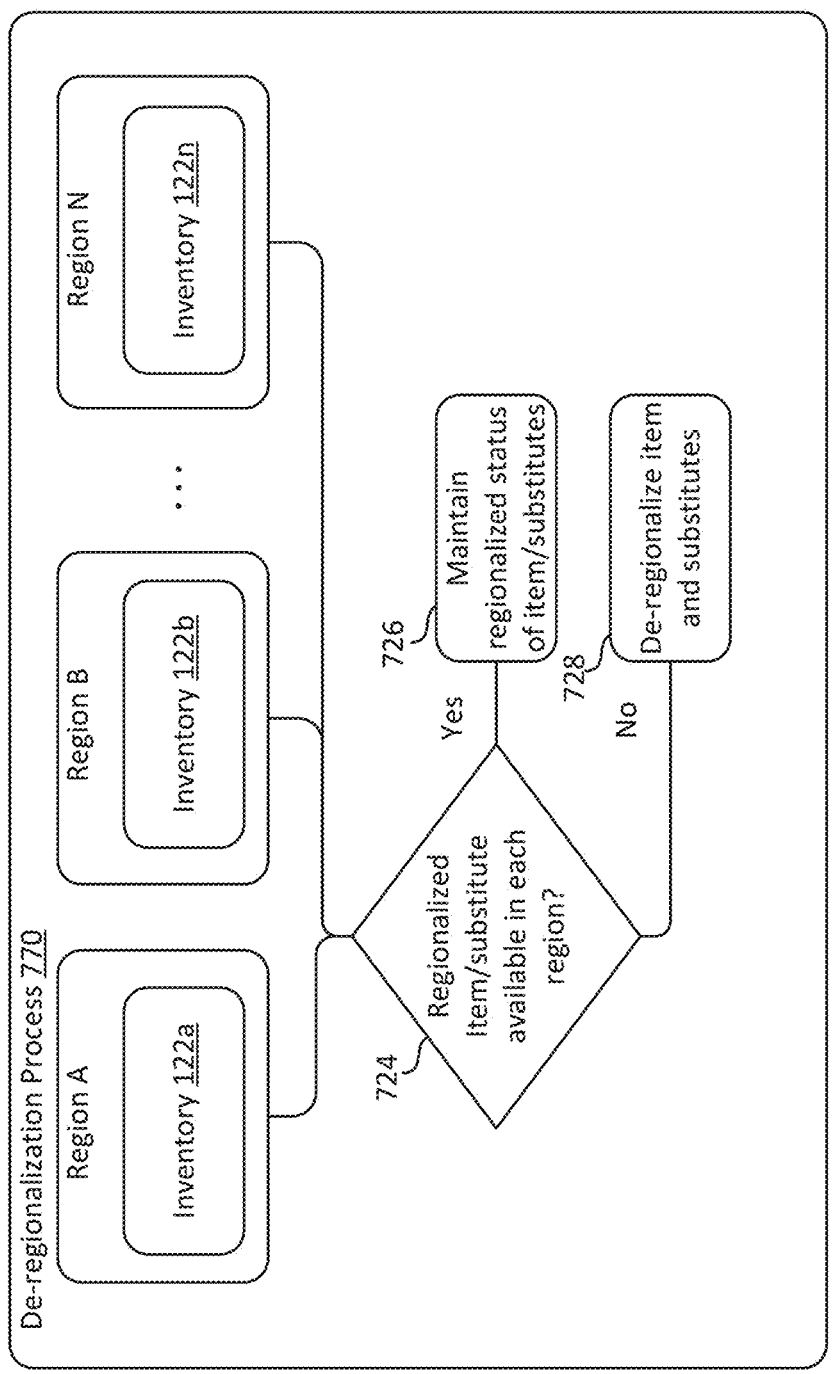
FIG. 7 depicts an example process by which content may be de-regionalized, in accordance with various aspects of the present disclosure.

FIG. 7 depicts an example de-regionalization process 770 by which content may be de-regionalized, in accordance with various aspects of the present disclosure. As previously described, regionalized content may be a content item where either the content item itself and/or one or more substitute items are available in each region in a pre-defined set of regions. However, if the inventory of the content item and its substitutes is depleted within a particular region of the pre-defined set of regions, the item (and its substitutes) may be de-regionalized by removing the discriminator data from the item and its substitutes in the search index.

For example, a determination may be made at block 724 whether the regionalized item and its substitutes are available in inventories 122a, 122b, ..., 122n of regions A, B, ..., N. If one or more of the item and/or its substitutes is available in each of the inventories 122a, 122b, ..., 122n, the regionalized status of the item and its substitutes may be maintained (block 726). Conversely, if there is a region in which neither the subject item nor any of its substitutes is available in inventory, the item and its substitutes may be de-regionalized (block 728). De-regionalizing an item may comprise deleting discriminator data in the search index such that the item is no longer regionalized to that particular region. In some examples, inventory systems may provide real-time inventory updates. Accordingly, items can be de-regionalized in near real time (e.g., within seconds of determining that inventory is depleted). De-regionalizing an item and its substitutes when inventor is depleted in one or more of the regions may result in out-of-region search results being provided.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, used to implement and distribute the infrastructure and web services offered by the provider network. The resources may, in some embodiments, be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may, in turn, run on top of a hypervisor).

A number of different types of computing devices may be used singly or in combination to implement the resources of the provider network in different embodiments, for example computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. In addition, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the non-transitory, computer-readable medium and executed by the instruction execution system. In the context of the present disclosure, a "non-transitory computer-readable medium" can be any medium that can contain, store, or maintain the logic or application described herein for use by or in connection with the instruction execution system. The non-transitory computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   modifying a search index to generate a modified search index based at least in part on associating regionalized items with discriminator data identifying a respective region corresponding to each of the regionalized items, wherein the regionalized items comprise at least a first item;
   receiving, from a first computing device, a first search query related to the first item;
   determining one or more items classified as substitute items for the first item;
   determining by at least one processor, that the first search query is associated with a first region of a plurality of regions;
   determining that the first item is regionalized in the modified search index, wherein the first item is regionalized if at least one of the first item and the one or more items classified as substitutes for the first item are available in each region of a plurality of regions, and wherein a regionalized item appears in search results only if the regionalized item is available in a region local to a given search query;

determining a first plurality of search results associated with the first region; and generating, by the at least one processor, code to cause the first computing device to display the first plurality of search results.

2. The method of claim 1, further comprising determining first metadata associated with the first search query, wherein the first metadata indicates that the first search query originated from the first region.

3. The method of claim 2, further comprising modifying the first search query to include second metadata, the second metadata configured to cause a filtering operation to remove the search results that are associated with regions other than the first region.

4. The method of claim 1, further comprising:
determining first attributes of the first item;
determining, using a machine learning model, that a second item is classified as a substitute for the first item, wherein the machine learning model determines a classification of the second item as the substitute based at least in part on similarities between the first attributes of the first item and second attributes of the second item; and
determining that the second item is associated with the first region, wherein the first plurality of search results includes data representing the second item.

5. The method of claim 1, further comprising:
determining that at least one of the first item and substitute items for the first item are available in each region of the plurality of regions;
generating metadata for the first item, wherein the metadata indicates a first region in which the first item is available; and
modifying the search index to associate the metadata with the first item.

6. The method of claim 1, further comprising:
determining a second item classified as a substitute for the first item, wherein the second item is associated with the first region; and
including the second item in the first plurality of search results based at least in part on the second item being associated with the first region.

7. The method of claim 1, further comprising:
determining that the first item is associated with a second region different from the first region; and
removing the first item from the first plurality of search results to generate the first plurality of search results based at least in part on the first item being associated with the second region, wherein the first plurality of search results includes a second item that is classified as a substitute for the first item and that is available in the first region.

8. The method of claim 1, further comprising:
determining a second item classified as a substitute item for the first item;
determining that the second item is only available in the first region of the plurality of regions; and
removing the first item from the first plurality of search results to generate the first plurality of search results, wherein the first plurality of search results includes the substitute item.

9. The method of claim 1, further comprising:
generating a database of items, wherein each item in the database of items is associated with substitutes for that item;

determining, for a second item in the database, that the second item and substitute items for the second item are available in the plurality of regions; and generating first data indicating that the second item and the substitute items for the second item are regionalized.

10. A system comprising:
at least one processor; and
at least one non-transitory computer-readable memory storing instructions that, when executed by the at least one processor, are effective to cause the at least one processor to:
modifying a search index to generate a modified search index based at least in part on associating regionalized items with discriminator data identifying respective regions corresponding to each of the regionalized items, wherein the regionalized items comprise at least a first item;
receive, from a first computing device, a first search query related to the first item;
determine, by at least one processor, that the first search query is associated with a first region;
determine a one or more items classified as substitute items for the first item;
determine that the first item is regionalized in the modified search index, wherein the first item is regionalized if at least one of the first item and the one or more items classified as substitutes for the first item are available in each region of a plurality of regions, and wherein a regionalized item appears in search results only if the regionalized item is available in a region local to a given search query;
determine a first plurality of search results associated with the first region; and
generate, by the at least one processor, code to cause the first computing device to display the first plurality of search results.

11. The system of claim 10, wherein the at least one non-transitory computer-readable memory stores further instructions that, when executed by the at least one processor, are further effective to cause the at least one processor to determine first metadata associated with the first search query, wherein the first metadata indicates that the first search query originated from the first region.

12. The system of claim 11, wherein the at least one non-transitory computer-readable memory stores further instructions that, when executed by the at least one processor, are further effective to cause the at least one processor to modify the first search query to include second metadata, the second metadata configured to cause a filtering operation to remove the search results that are associated with regions other than the first region.

13. The system of claim 10, wherein the at least one non-transitory computer-readable memory stores further instructions that, when executed by the at least one processor, are further effective to cause the at least one processor to:
determine first attributes of the first item;
determine, using a machine learning model, that a second item is classified as a substitute for the first item, wherein the machine learning model determines a classification of the second item as the substitute based at least in part on similarities between the first attributes of the first item and second attributes of the second item; and determine that the second item is associated with the first region, wherein the first plurality of search results includes data representing the second item.

14. The system of claim 10, wherein the at least one non-transitory computer-readable memory stores further instructions that, when executed by the at least one processor, are further effective to cause the at least one processor to:
determine that at least one of the first item and substitute items for the first item are available in each region of the plurality of regions; and
generate metadata for the first item, wherein the metadata indicates a region in which the first item is available.

15. The system of claim 10, wherein the at least one non-transitory computer-readable memory stores further instructions that, when executed by the at least one processor, are further effective to cause the at least one processor to:
determine a second item classified as a substitute for the first item, wherein the second item is associated with the first region; and
include the second item in the first plurality of search results based at least in part on the second item being associated with the first region.

16. The system of claim 10, wherein the at least one non-transitory computer-readable memory stores further instructions that, when executed by the at least one processor, are further effective to cause the at least one processor to:
determine that the first item is associated with a second region different from the first region; and
remove the first item from the first plurality of search results to generate the first plurality of search results based at least in part on the first item being associated with the second region, wherein the first plurality of search results includes a second item that is classified as a substitute for the first item and that is available in the first region.

17. The system of claim 10, wherein the at least one non-transitory computer-readable memory stores further instructions that, when executed by the at least one processor, are further effective to cause the at least one processor to:
determine a second item classified as a substitute item for the first item;
determine that the second item is only available in the first region of the plurality of regions; and
remove the first item from the first plurality of search results to generate the first plurality of search results, wherein the first plurality of search results includes the substitute item.

18. A method comprising:
regionalizing a first item by determining that at least one of the first item and one or more items classified as substitutes for the first item are available in each region of a plurality of regions, wherein a regionalized item appears in search results only if the regionalized item is available in a region local to a given search query;
modifying a search index to generate a modified search index based at least in part on associating the first item with discriminator data identifying regions corresponding to the first item;
receiving, from a first computing device, a first search query related to the first item;
determining, by at least one processor, that the first search query is associated with a first region of a plurality of regions;
determining that the first item is regionalized in the modified search index; and
generating a first plurality of search results associated with the first region.

19. The method of claim 18, further comprising determining first metadata associated with the first search query, wherein the first metadata indicates that the first search query originated from the first region.

20. The method of claim 19, further comprising modifying the first search query to include second metadata, the second metadata configured to cause a filtering operation to remove the search results that are associated with regions other than the first region.

* * * * *